Patented Mar. 3, 1942

2,274,695

UNITED STATES PATENT OFFICE 2,274,695

PROTEIN COMPOSITION OF IMPROVED WATER RESISTANCE

Albert J. Heberer, River Forest, and Clarence Harold Phillips, Chicago, Ill., assignors to The Glidden Company, Cleveland, Ohio, a corporation of Ohio No Drawing. Application August 1, 1940, Serial No. 349,232

11 Claims. (Cl. 106—154)

The present invention relates to vegetable protein compositions, and particularly relates to such compositions having improved water resistance.

Various attempts have been made to improve the water resistance of protein coating compositions. Among these may be mentioned the treatment of the coatings with formaldehyde or with alkaline earth metal salts to form the insoluble alkaline earth proteinates. Another method which has been employed is to incorporate a drying oil in the aqueous dispersion of the protein. In many instances, however, these expedients leave much to be desired.

It has been discovered that if in addition to inclusion of a drying oil some glycerine is also added to the composition that the waterproofness of the resulting dried composition is considerably improved over that resulting from the composition to which no glycerine has been added. This is a rather startling result in view of the fact that glycerine is an extremely hygroscopic material and its inclusion in a protein composition containing no drying oil results in a decrease in the water resistance of the dried film. It is believed that the glycerine functions in some manner whereby the drying oil is enabled to dry better and that this results in the improved water resistance of the film. Whatever the explanation, however, a definite increase in water resistance is noted when glycerine in proper amounts is used.

Of course if too large amounts of glycerine are used the added water resistance may be decreased by the excess glycerine. It has been found that in the case of an isolated soybean protein the washability of the dried coating compositions will increase as the amount of glycerine is increased up to about 100% based on the weight of the protein and that above about 100% the washability decreases from that at 100%. Thus 100% is better than either 75% or 125%.

Any suitable drying oil may be used such as linseed oil, China-wood oil, perilla, oiticica, dehydrated castor oil, etc.

The proteins contemplated by the present invention are proteins such as are present in oleaginous seed materials like soybeans, peanuts, lupines, cottonseed, etc. and preferably are those which are generically classified as globulin proteins. It is preferred to use an isolated protein, since it is free from the water soluble constituent and from water absorbing fibres, etc.; although the advantages of the present invention are obtainable from the whole seed material. However, where waterproofness is desired it is generally desirable to have as high a degree of waterproofness as possible and for this reason the isolated protein is preferred. Isolated soybean protein has been found particularly suitable.

The present invention is particularly useful when formaldehyde, paraformaldehyde, etc. are also used. Paraformaldehyde may be added to the solution to render the protein insoluble when dry, and when certain globulin proteins are used such as a hydrolyzed globulin protein, formaldehyde in considerable amounts may be used without gelling of the solution for considerable periods of time, but at the same time the protein is insolubilized upon drying. Thus by using an insolubilizing agent for the protein, together with a drying oil and glycerine a remarkable degree of waterproofness is attained. Other aldehyde insolubilizing agents for the protein may be used.

The amounts of oil used, however, will vary, depending upon the particular properties desired in the composition and will ordinarily be such as give, within limits, the desired waterproofness. By the inclusion of the glycerine the amount of oil may be decreased to give the same degree of waterproofness.

The protein composition contemplated by the present invention may be used in the preparation of pigmented compositions such as paints, paper coating compositions, fibre board coating compositions, etc. For example, to an isolated hydrolyzed soybean protein solution comprising 180 parts of protein dissolved in 1140 parts of water by means of sodium hydroxide may be included 36 parts of glycerine, 46 parts of dehydrated castor oil, 1400 parts of lithopone, 225 parts of China clay, 153 parts of asbestos and 15 parts of paraformaldehyde; or where clear films having improved water resistance are desired the pigments may be omitted. In either case, however, the compositions containing the glycerine and drying oil show greater water resistance when dry than those in which no glycerine is used or those in which no drying oil is used.

Having described the invention, what is claimed is:

1. A protein composition of improved water resistance when dry comprising an aqueous alkali solution of vegetable protein formaldehyde, a drying oil dispersed therein and glycerine in an amount up to 125% by weight of the protein sufficient to increase the water resistance of said composition when dry.

2. The composition of claim 1 in which the protein is a globulin protein.

3. The composition of claim 1 in which the protein is an isolated globulin protein.

4. The composition of claim 1 in which the protein is an isolated soybean globulin protein.

5. A protein coating composition of improved water resistance when dry comprising an aqueous alkali solution of vegetable protein formaldehyde, a drying oil dispersed therein, pigment and glycerine in an amount up to 125% by weight of the protein sufficient to increase the water resistance of the composition when dry.

6. The composition of claim 5 in which the protein is an isolated soybean globulin protein.

7. A protein composition of matter comprising an aqueous alkali solution of isolated soybean protein, a drying oil dispersed therein, an aldehyde insolubilizing agent for the protein and glycerine in an amount up to 125% by weight of the protein sufficient to increase the water resistance of the composition when dried.

8. A protein composition of matter comprising an aqueous alkali solution of a hydrolyzed soybean protein, a drying oil dispersed therein, formaldehyde and glycerine in an amount approximately equal to the weight of the protein.

9. A protein composition of matter comprising an aqueous alkali solution of a hydrolyzed soybean protein, a drying oil dispersed therein, an aldehyde insolubilizing agent for the protein, and glycerine in an amount up to 125% by weight of the protein sufficient to increase the water resistance of the composition when dry.

10. A composition of matter comprising an aqueous alkali solution of isolated soybean protein, a drying oil dispersed therein, an aldehyde insolubilizing agent for the protein, pigment, and glycerine in an amount up to 125% by weight of the protein sufficient to increase the water resistance of the composition when dry.

11. A composition of matter comprising an aqueous solution of an isolated hydrolyzed soybean protein formaldehyde, a drying oil dispersed therein, pigment, and glycerine in an amount approximately equal to the weight of the protein.

ALBERT J. HEBERER.
CLARENCE HAROLD PHILLIPS.